United States Patent
Przybyl et al.

(10) Patent No.: US 8,661,787 B1
(45) Date of Patent: Mar. 4, 2014

(54) LEAN KICK CATALYST MONITORING SYSTEM

(75) Inventors: Andrew J. Przybyl, Berlin, WI (US); William R. Robertson, Oshkosh, WI (US); Mark A. Frank, Lake Orion, MI (US); Kasser A. Jaffri, Rochester, MI (US); Ronald L. Hall, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 424 days.

(21) Appl. No.: 12/688,156

(22) Filed: Jan. 15, 2010

(51) Int. Cl.
*F01N 3/00* (2006.01)
(52) U.S. Cl.
USPC .................................. 60/285; 60/274; 60/320
(58) Field of Classification Search
USPC ..................... 60/274, 276, 277, 285, 298, 299
See application file for complete search history.

(56) References Cited

U.S. PATENT DOCUMENTS

| | | | | |
|---|---|---|---|---|
| 4,707,984 A | * | 11/1987 | Katsuno et al. | 60/274 |
| 5,265,416 A | * | 11/1993 | Hamburg et al. | 60/274 |
| 5,289,678 A | * | 3/1994 | Grutter | 60/277 |
| 5,465,697 A | * | 11/1995 | Hamburg et al. | 123/406.47 |
| 6,116,022 A | * | 9/2000 | Woodward | 60/300 |
| 6,389,806 B1 | * | 5/2002 | Glugla et al. | 60/284 |
| 6,755,013 B2 | * | 6/2004 | Uchida | 60/277 |
| 2010/0146954 A1 | * | 6/2010 | Sloss et al. | 60/320 |

* cited by examiner

*Primary Examiner* — Thomas Denion
*Assistant Examiner* — Matthew T Largi
(74) *Attorney, Agent, or Firm* — Andrus Intellectual Property Law, LLP

(57) ABSTRACT

A method and system for monitoring a three-way catalyst cooled by a coolant and treating internal combustion engine exhaust by oxidizing HC and CO and reducing $NO_x$ is provided to prevent false-fail monitoring. An initial lean kick excursion of fuel-air ratio Phi is provided prior to the first reducing step or interval of the first cycle.

14 Claims, 3 Drawing Sheets

LEAN KICK CATALYST MONITORING SYSTEM

BACKGROUND AND SUMMARY

The invention relates to three-way catalysts treating internal combustion engine exhaust, and more particularly to three-way catalysts cooled by a coolant.

Three-way catalysts cooled by a coolant are known in marine applications for treating internal combustion engine exhaust by oxidizing HC and CO and reducing $NO_x$. Unlike automotive applications, such catalysts in marine applications are cooled by a coolant, e.g. cooling water from the lake or other body of water in which the marine vessel is operating, which cooling water flows through a jacket around the catalyst, i.e. coolant-jacketed.

The present invention arose during continuing development efforts directed toward improved accuracy of the monitoring of the cooled three-way catalyst, including oxygen storage capacity, OSC.

DETAILED DESCRIPTION

Prior Art

Figure 1:
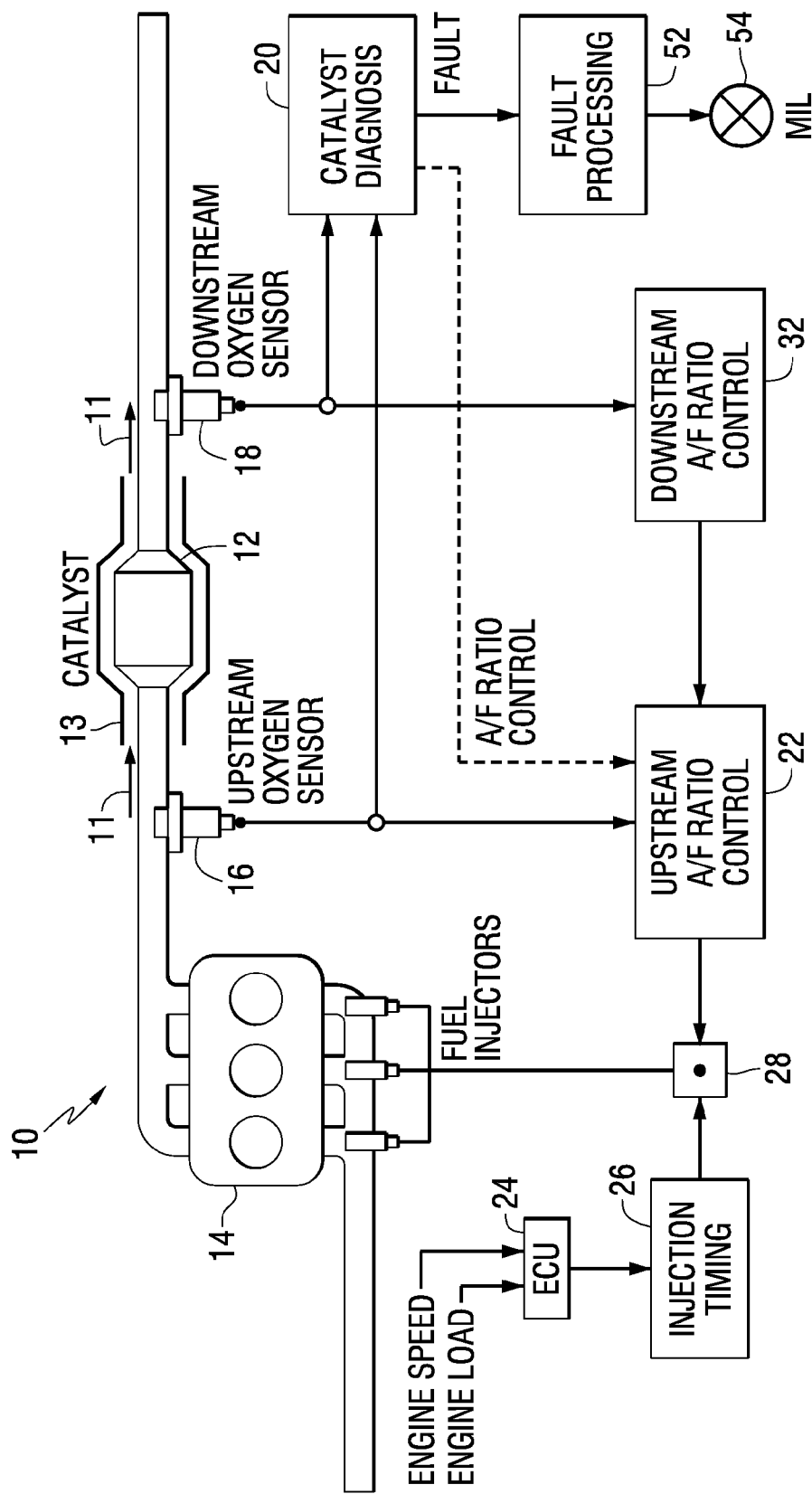
FIG. 1 is a schematic block diagram of a marine internal combustion engine monitoring system known in the prior art.

FIG. 1 shows a marine monitoring system 10 as known in the prior art for a three-way catalyst 12 treating exhaust from an internal combustion engine 14 by oxidizing HC and CO and reducing $NO_x$. The catalyst is cooled by a coolant 11, e.g. cooling water from the lake or other body of water in which the marine vessel is operating, which cooling water flows through a jacket 13 around the catalyst, whereby the catalyst is coolant-jacketed. A first oxygen sensor 16 senses oxygen in the exhaust upstream of catalyst 12 prior to treatment by the catalyst. A second oxygen sensor 18 senses oxygen in the exhaust downstream of catalyst 12 after treatment by the catalyst. The oxidization of HC and CO results in high concentrations of $NO_x$. The reduction of $NO_x$ results in high concentrations of HC and CO. To optimize conversion efficiency, the fuel-air ratio, Phi, is maintained within a narrow window to ensure that the desired stoichiometric ratio is maintained. In this window, the reaction of fuel and air results in a complete or at least optimized burning of the carbon and hydrogen.

The three-way catalyst together with the upstream and downstream oxygen sensors provide a closed-loop control system for effectively removing or minimizing pollutants from the exhaust. When the fuel-air ratio Phi is lean, i.e. normalized Phi<1, the catalyst is able to store oxygen. This stored oxygen is used in the oxidization of HC and CO when the fuel-air mixture is rich, i.e. normalized Phi>1.

As the catalyst deteriorates, its ability to store oxygen is reduced. Accordingly, oxygen capacity of the catalyst is related to its operating efficiency. With an oxygen sensor before and after the catalyst, as at 16 and 18, respectively, the oxygen storage capacity, OSC, of the catalyst can be determined, and accordingly its operating efficiency.

Figure 2:
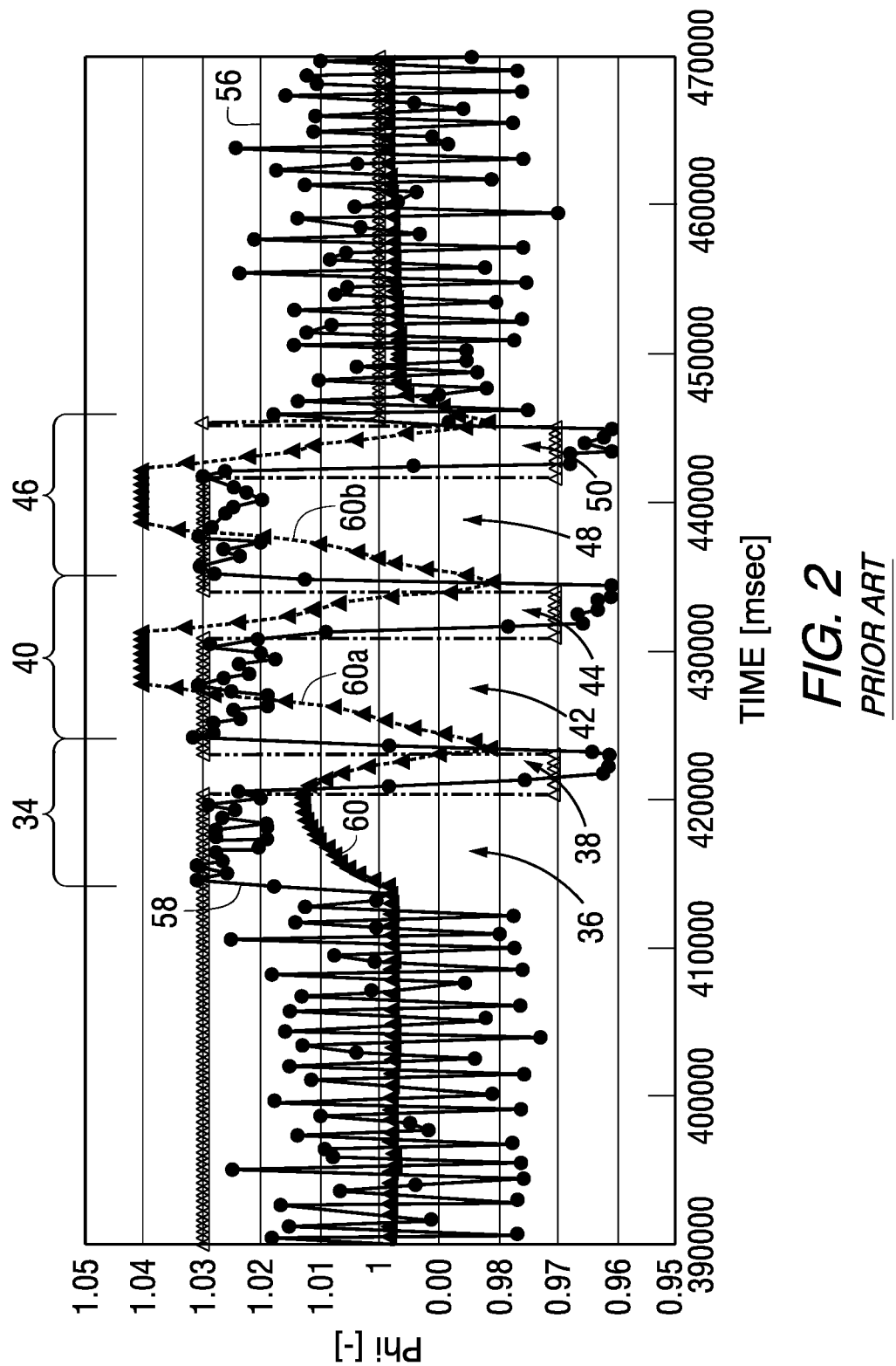
FIG. 2 is a graph illustrating operation of the system of FIG. 1.

One known monitoring system measures oxygen storage capacity of the catalyst as a measure of operating efficiency of the catalyst by performing a two-step or two-interval open-loop control process. The first step or interval is a reducing step or interval adjusting fuel-air ratio Phi to a rich mixture with normalized Phi>1 to reduce stored oxygen in the catalyst, for example, catalyst diagnosis module 20 commands upstream ratio module 22 to alter the commands otherwise provided by ECU, electronic control unit, 24 (responsive to engine speed and engine load) and injection timing module 26 supplied through multiplier module 28 to fuel injectors 30, all as is known. The first and second oxygen sensors 16 and 18 then register respective rich Phi readings. The second step or interval is an oxidizing step or interval adjusting fuel-air ratio Phi to a lean mixture with normalized Phi<1 to increase stored oxygen in the catalyst, with the first and second oxygen sensors registering respective lean Phi readings, which readings are supplied to the upstream and downstream ratio modules 22 and 32 and to diagnosis module 20. The noted first and second steps or intervals are repeated over a plurality of cycles. This is illustrated in FIG. 2 showing a first cycle 34 having first and second steps or intervals 36 and 38, second cycle 40 having first and second steps or intervals 42 and 44, third cycle 46 having first and second steps or intervals 48 and 50. During the first step (reducing step), the rich mixture is intended to ensure that the catalyst is saturated with HC and CO. If the readings from the oxygen sensors do not rise above and cross a rich threshold within a given time, the diagnostic is aborted and will re-initialize. After a specified number of unsuccessful attempts to the run the diagnostic, the system will abort and a flag will be set at fault processing module 52 which may also activate a malfunction indicator light, MIL, at 54.

In the noted second step or interval, e.g. 38, 44, 50, etc., a lean fuel-air mixture is flushed into the catalyst, and the amount of oxygen stored is calculated up to the point where oxygen can be noticed by the downstream oxygen sensor 18. This is known as oxidizing. When all or substantially most of the oxygen has been adsorbed by the catalyst, oxygen breakthrough will be indicated by the reading of the downstream oxygen sensor falling below a minimum lean threshold. The OSC, oxygen storage capacity, of the catalyst can then be calculated based on the known exhaust air mass flow, fuel-air ratio, and the amount of time it took for oxygen to break through the catalyst, all as is known.

Present Application

The preferred embodiment of the present invention addresses and solves a problem identified during oxygen storage capacity monitoring in the above system, namely during the first step e.g. 36 of the first cycle e.g. 34, the downstream oxygen sensor 18 reading would take extra time to reach the rich threshold target, e.g. 56, or would not reach such target at all. This creates inconsistencies in the OSC results and in some cases causes a false-fail of the monitoring sensor check within the diagnostic. In FIG. 2, the upstream oxygen sensor reading is shown at 58, and the downstream oxygen sensor reading is shown at 60. As seen in comparing first cycle 34 against subsequent cycles 40, 46, the response of downstream oxygen sensor 18 is sluggish during first cycle 34, as shown at Phi reading 60 in first cycle 34 as compared to Phi reading 60*a* in second cycle 40, and Phi reading 60*b* in third cycle 46.

During investigation and development, it was recognized that a possible cause of the noted sluggishness and false-fail problem could be the cooling of the catalyst and/or the downstream oxygen sensor in the marine application involving a coolant-jacketed catalyst, which may also cool the downstream oxygen sensor. This problem is not an issue in automotive applications, which do not have coolant-jacketed catalysts.

Figure 3:
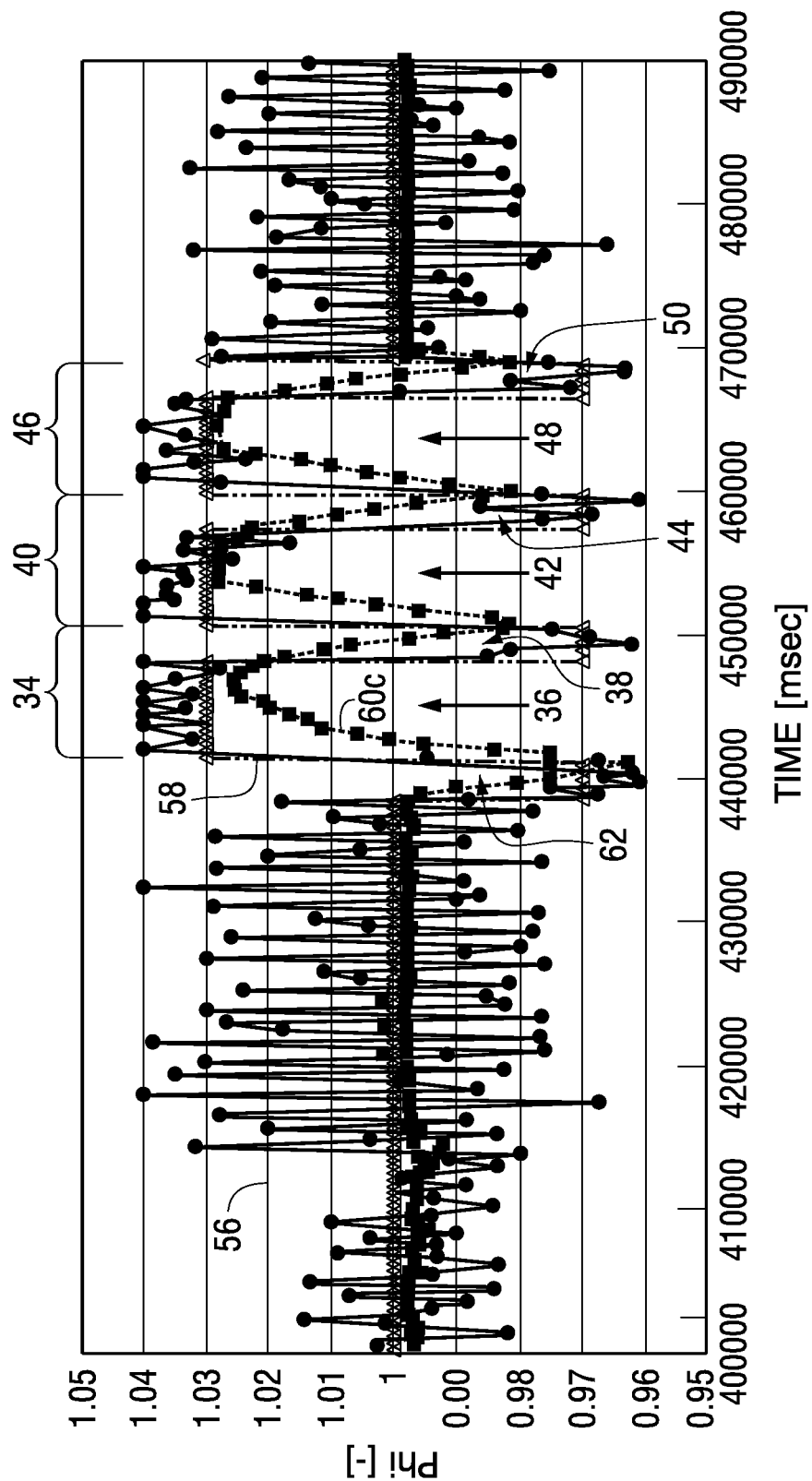
FIG. 3 is like FIG. 2 and illustrates the present invention.

In accordance with a preferred embodiment of the present system, a possible solution was recognized and attempted by raising the exhaust gas temperature for the first step or interval 36 of the first cycle 34. In the preferred embodiment, this is provided by an initial lean excursion or kick as shown at 62 in FIG. 3. This was found to be successful because the Phi reading 60c of downstream oxygen sensor 18 during the immediately succeeding first step or interval 36 of first cycle 34 did indeed cross and rise above rich threshold 56. It is believed that implementation of the initial lean kick excursion at 62 increases the wall and gas temperatures of the catalyst 12 and/or downstream oxygen sensor 18, prior to the first step or interval 36 of first cycle 34, such that during first step or interval 36 of first cycle 34, the downstream oxygen sensor 18 registers a higher Phi reading than without lean kick excursion 62. It is believed that lean kick excursion 62 raises exhaust temperature immediately prior to first cycle 34 and overcomes cooling of the exhaust in the catalyst otherwise caused by cooling thereof by the coolant, e.g. by coolant-jacketed cooling thereof. It is believed that lean kick excursion 62 raises the operating temperature of downstream exhaust sensor 18 immediately prior to first cycle 34 to a temperature higher than that otherwise caused by cooling thereof by the coolant, e.g. by coolant-jacketed cooling of catalyst 12. It is believed that lean kick excursion 62 raises the operating temperature of catalyst 12 prior to first cycle 34 and overcomes cooling of the catalyst otherwise caused by cooling thereof by the coolant, e.g. coolant-jacketed cooling thereof. Oxygen storage capacity of the catalyst may then be accurately determined by the length of time it takes the second oxygen sensor 18 to reach a given lean Phi reading after the beginning of the second step or interval, as above. The system may have application in various non-marine internal combustion engine implementations where a three-way catalyst is cooled by a coolant adversely impacting first cycle monitoring operation, e.g. as shown at 60 in FIG. 2 during step or interval 36 of first cycle 34.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. The present system may be used in various alternate embodiments and applications, including marine applications, automotive applications, including trucks, and off-road vehicles, and other applications, and including various types of internal combustion engines, including gasoline, diesel, ethanol, etc., having a catalyst cooled by a coolant, which coolant may be various fluids, including liquid (e.g. water, glycol, etc.) and air, and including various cooling structures, including coolant jacketed catalysts, in various applications treating internal combustion engine exhaust.

What is claimed is:

1. A method of preventing a false-fail in a marine oxygen storage capacity measuring system monitoring a marine three-way catalyst treating internal combustion engine exhaust by oxidizing HC and CO and reducing $NO_x$, comprising:

cooling said catalyst with a liquid coolant;

providing a first oxygen sensor sensing oxygen in said exhaust upstream of said catalyst prior to treatment by said catalyst;

providing a second oxygen sensor sensing oxygen in said exhaust downstream of said catalyst after treatment by said catalyst;

performing closed-loop control of said system with said catalyst and said first and second oxygen sensors so as to maintain a fuel-air ratio of said exhaust;

during said closed-loop control, initiating open loop control and measuring oxygen storage capacity of said catalyst as a measure of operating efficiency of said catalyst by performing a first step comprising a reducing step adjusting fuel-air ratio Phi to a rich mixture with normalized Phi>1 to reduce stored oxygen in said catalyst, with said first and second oxygen sensors registering respective rich Phi readings, performing a second step comprising an oxidizing step adjusting fuel-air ratio Phi to a lean mixture with normalized Phi<1 to increase stored oxygen in said catalyst, with said first and second oxygen sensors registering respective lean Phi readings, repeating said first and second steps over a plurality of cycles;

and preventing a false-fail of said monitoring during the first of said cycles comprising providing an initial lean kick excursion of Phi prior to the first step of said first cycle and terminating at the beginning of said first step of said first cycle such that during said first step of said first cycle said second oxygen sensor registers a richer Phi reading than without said lean kick excursion.

2. The method according to claim 1 comprising using said lean kick excursion to raise exhaust temperature immediately prior to said first cycle and overcome cooling thereof in said catalyst otherwise caused by cooling thereof by said coolant.

3. The method according to claim 1 comprising using said lean kick excursion to raise the operating temperature of said second oxygen sensor immediately prior to said first cycle to a temperature higher than that otherwise caused by cooling thereof by said coolant.

4. The method according to claim 1 comprising using said lean kick excursion to raise the operating temperature of said catalyst immediately prior to said first cycle and overcome the cooling of said catalyst otherwise caused by cooling thereof by said coolant.

5. The method according to claim 1 comprising measuring oxygen storage capacity of said catalyst by the length of time it takes said second oxygen sensor to reach a given lean Phi reading after the beginning of said second step.

6. The method according to claim 1 comprising providing a coolant-jacketed said three-way catalyst.

7. The method according to claim 6 comprising providing a marine said coolant-jacketed three-way catalyst.

8. A false-fail prevention system preventing a false-fail in a marine oxygen storage capacity measuring system monitoring a marine three-way catalyst treating internal combustion engine exhaust by oxidization of HC and CO and reduction of $NO_x$, comprising:

a coolant jacket containing coolant cooling said catalyst;

a first oxygen sensor sensing oxygen in said exhaust upstream of said catalyst prior to treatment by said catalyst;

second oxygen sensor sensing oxygen in said exhaust downstream of said catalyst after treatment by said catalyst;

wherein said system measures oxygen storage capacity of said catalyst as a measure of operating efficiency of said catalyst;

wherein said system performs closed-loop control with said catalyst and said first and second oxygen sensors so as to maintain a fuel-air ratio of said exhaust;

wherein during said closed-loop control, said system initiates open loop control and has a first interval comprising a reduction interval adjusting fuel-air ratio Phi to a rich mixture with normalized Phi>1 to reduce stored oxygen in said catalyst, said first and second oxygen sensors registering respective rich Phi readings, wherein said system has a second interval comprising an oxidization interval adjusting fuel-air ratio Phi to a lean mixture with normalized Phi<1 to increase stored oxygen in said catalyst, said first and second oxygen sensors registering respective lean Phi readings, wherein said system repeats said first and second intervals over a plurality of cycles;

wherein said system prevents a false-fail measurement during the first of said cycles by providing an initial lean kick excursion of Phi prior to the first interval of said first cycle and terminating at the beginning of said first interval of said first cycle such that during said first interval of said first cycle said second oxygen sensor registers a richer Phi reading than without said lean kick excursion.

9. The system according to claim 8 wherein said lean kick excursion raises exhaust temperature immediately prior to said first cycle and overcomes cooling thereof in said catalyst otherwise caused by cooling thereof by said coolant.

10. The system according to claim 8 wherein said lean kick excursion raises the operating temperature of said second oxygen sensor immediately prior to said first cycle to a temperature higher than that otherwise caused by cooling thereof by said coolant.

11. The system according to claim 8 wherein said lean kick excursion raises the operating temperature of said catalyst immediately prior said first cycle and overcomes the cooling of said catalyst otherwise caused by cooling thereof by said coolant.

12. The system according to claim 8 wherein said oxygen storage capacity is measured by the length of time it takes said second oxygen sensor to reach a given lean Phi reading after the beginning of said second interval.

13. The system according to claim 8 comprising a coolant-jacketed said three-way catalyst.

14. The system according to claim 13 comprising a marine said coolant-jacketed three-way catalyst.

* * * * *